United States Patent [19]
Roux

[11] 3,766,487
[45] Oct. 16, 1973

[54] DISCHARGE TUBE WITH DISMOUNTABLE ELECTRODE

[75] Inventor: Roland Roux, Orsay, France

[73] Assignee: Compagnie Industrielle Des Lasers, Marcoussis, France

[22] Filed: Nov. 13, 1970

[21] Appl. No.: 89,220

[30] Foreign Application Priority Data
Nov. 27, 1969 France .............................. 6941000

[52] U.S. Cl........... 331/94.5 PE, 313/110, 313/286, 331/94.5 D, 331/94.5 G
[51] Int. Cl............................................. H01s 3/00
[58] Field of Search.................... 313/281, 288, 356, 313/237, 285, 286, 278, 253, 146, 110; 331/94.5

[56] References Cited
UNITED STATES PATENTS

| | | | |
|---|---|---|---|
| 1,911,793 | 5/1933 | Brandt............................ | 313/285 X |
| 2,745,981 | 5/1956 | Sanabria et al................. | 313/285 X |
| 2,853,643 | 9/1958 | Iversen.......................... | 313/285 UX |
| 3,034,009 | 5/1962 | Zunick et al.................... | 313/285 X |
| 2,056,034 | 9/1936 | Brucker.......................... | 313/356 X |
| 3,295,000 | 12/1966 | Johnson......................... | 313/356 X |
| 3,560,779 | 2/1971 | May................................ | 313/288 X |
| 3,588,574 | 6/1971 | Hogg................................ | 313/237 |
| 3,167,679 | 1/1965 | Lyon et al...................... | 313/281 X |

FOREIGN PATENTS OR APPLICATIONS

| | | | |
|---|---|---|---|
| 653,952 | 5/1951 | Great Britain..................... | 313/285 |
| 348,471 | 10/1960 | Switzerland....................... | 313/237 |

*Primary Examiner*—John K. Corbin
*Attorney*—Sughrue, Rothwell, Mion, Zinn & Macpeak

[57] ABSTRACT

Discharge tube comprising a compartment in which at least two electrodes are arranged. One electrode is kept inside the compartment by at least two wall bushings whose ends, penetrating inside the compartment, rest flexibly on the lateral wall of the electrode.

2 Claims, 1 Drawing Figure

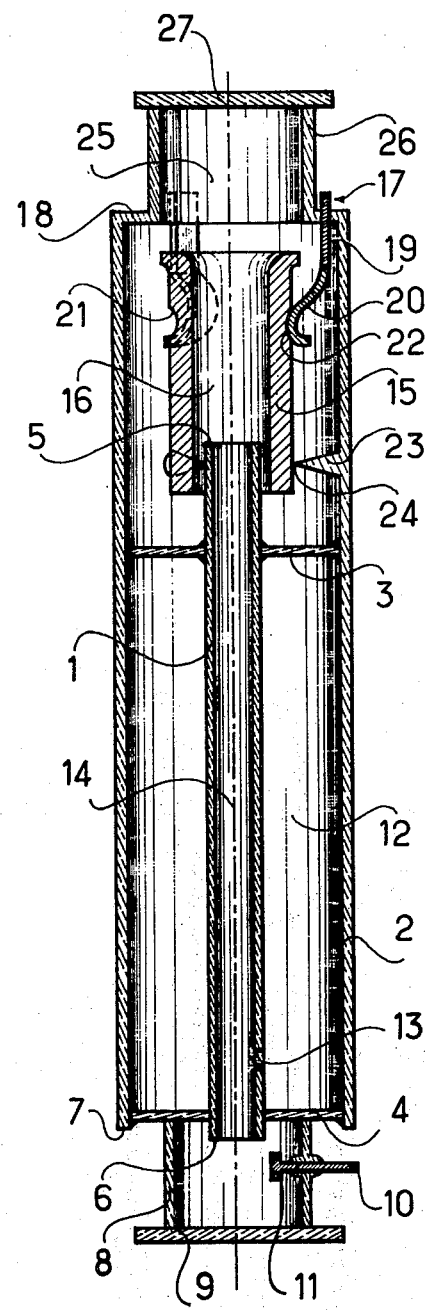

DISCHARGE TUBE WITH DISMOUNTABLE ELECTRODE

BACKGROUND OF THE INVENTION

1. FIELD OF THE INVENTION

The present invention concerns discharge tubes, and is particularly, but not exclusively, concerned with laser discharge tubes.

2. DESCRIPTION OF THE PRIOR ART

A discharge tube generally consists of an oblong enclosure with an electrode situated at each end and between which the discharge takes place.

Several ways of disposing an electrode in a discharge tube have previously been proposed. In one proposal, the electrode is welded directly to a support element passing through the discharge tube wall. In another proposal, the electrode and a support element are provided with cooperating male and female conical portions which are force fitted to one another to provide support for the electrode. In a third proposal, the electrode is provided with a portion of the same diameter as the support element passing through the discharge tube wall, and the electrode is held in line with this element by means of a sleeve supported elastically on the side walls of the support element and of that portion of the electrode.

Such electrode mounting arrangements are not adapted to laser discharge tubes, particularly in the case where the electrode is disposed on the discharge tube axis. When the electrode is so disposed, it must be provided with an axial bore along the tube axis so as not to block the laser beam. Moreover, in laser discharge tubes the electrodes are subjected to very high temperatures during long periods, so that the electrodes rapidly deteriorate and must be frequently replaced.

When the electrode is provided with an axial bore, it is generally welded to support elements disposed radially of the electrode and passing through the discharge tube walls. When it is necessary to replace such an electrode, it must be detached from the support elements, and this generally involves the vaporization of a small quantity of metal. The resulting metallic vapors can find their way on the optical elements closing the laser tube and thus reducing their transmission power.

SUMMARY OF THE INVENTION

The present invention is intended to reduce the disadvantages of the previously proposed arrangements, and to provide a discharge tube in which mounting and dismounting of an electrode is readily achieved, while maintaining a monobloc discharge tube structure.

In accordance with the invention, a discharge tube contains an electrode supported by at least one support element passing through a wall of the tube and whose end portion inside the tube bears elastically against a side wall of the electrode.

A discharge tube has walls defining an enclosure and an electrode disposed within the enclosure. At least one support element passes through the walls of the enclosure and has a first end portion within the enclosure bearing elastically against the electrode, so that the electrode is elastically supported within the enclosure. The electrode is cylindrical and has an axial bore aligned with an axis of the discharge tube. The support element bears against side walls of this cylinder, which is further located by spigots standing away from inside surfaces of the enclosure walls. An inner tube member of the discharge tube, mounted with its axis co-incident with the discharge tube axis, partially locates inside the axial bore in the cylindrical electrode. The discharge tube has a sleeve portion of internal diameter greater than the external diameter of the cylindrical electrode and closed by a readily detachable closure element providing access to the electrode. The electrode is formed with a groove extending around its periphery in which the support element end portion or portions locate.

IN THE DRAWING

The invention will now be described in more detail, by way of example only, with reference to the accompanying diagrammatic drawing.

The single FIGURE is a longitudinal section of a discharge tube.

DESCRIPTION OF THE PREFERRED EMBODIMENT

Referring to the Figure, a laser discharge tube consists of co-axial tubes 1 and 2 of which the outer tube 2 is longer than the inner tube 1. These two tubes are so arranged that their respective ends 6 and 7 are approximately co-planar. The tubes 1 and 2 are held centered by membranes 3 and 4 extending between the inner wall surfaces of tube 2 and the outer wall surfaces of tube 1.

The membrane 4 is placed as close as possible to the tube extremities 6 and 7, while the membrane 3 is situated at some distance from the extremity 5 of the inner tube 1.

A cylindrical sleeve 8 is attached to the membrane 4 and carries at its extremity an optical element of the laser tube. In the particular example shown in the Figure, this is a mirror 9 but it will be appreciated that this may be replaced with other suitable elements, for example, a plate disposed at the Brewster incidence.

A support element 10 passes through the wall of the sleeve 8, and carries at its inner end an electrode 11.

The space 12 between tubes 1 and 2 and membranes 3 and 4 is in communication with the interior 14 of tube 1 through an opening 13 formed in the wall of this tube. This space 12 provides a chamber for holding a reserve of gas and thus contributing to an increase in the life of the discharge tube.

The second electrode 15 of the discharge tube consists of a metallic cylinder 15 with an axial bore 16 aligned with the axis of the inner tube 1. The end portion of the inner tube 1 extends into this axial bore 16 in the second electrode.

The electrode 15 is held in position inside the tube 2 by at least two support elements passing through the discharge tube wall. One of these elements is shown at 17 and another is indicated in dotted outline. The support elements 17 each have a rigid portion 19 passing through a ring 18 partially closing the end of the tube 2. Inside the discharge tube, each element 17 has an elastic portion 20 curved into a U-shaped leaf spring whose inside face 22 bears against a groove 21 of semicircular cross section running around an upper portion of the electrode 15.

Preferably three support elements 17 are provided, equiangularly spaced around the ring 18.

Where the length of the cylinder providing electrode 15 is great, its opposite end portion is located within the tube 2 by means of at least two projections standing away from the inside surface of this tube. One such projection is shown at 23, another being indicated in dotted outline.

These projections extend away from the inside wall of the tube 2 so as to just contact the outer surface of the electrode 15. Deterioration of the tube assembly on heating is thus avoided.

On the ring 18 is mounted a sleeve 26 co-axial with the tube 2 and whose internal diameter is slightly greater than the greatest outside diameter of the electrode 15. The sleeve 26 is closed by an optical element 27 co-operating with the element 9 to provide the laser cavity.

Since the interior 25 of the sleeve 26 is of great diameter than the electrode 15, the latter can be inserted into the discharge tube as a penultimate stage in its fabrication, so as to guard it as long as possible from impurities which may become attached to its surface and subsequently migrate to the optical elements 9 and 27. When it is required to change the electrode 15, it is a simple matter to remove the optical element 27 and slide the electrode out through the sleeve 26.

Preferably, three projections 23 are provided, equiangularly spaced around the discharge tube axis.

What is claimed is:

1. A laser discharge tube comprising:
   an enclosure including inner and outer concentric tubes defining coaxial first and second passages, said outer tube extending beyond said inner tube at both ends and closed at said ends by optical elements to define therewith an optical resonant cavity,
   a first tubular metal electrode positioned concentrically between said tubes and in partial telescoping position with respect to said inner tube at one end thereof,
   a second electrode positioned adjacent the other end of said inner tube and within said outer tube and acting with said first electrode to effect an electrical discharge therebetween and generate a laser beam, said discharge and said laser beam passing through said first and second passages, and
   support means having a rigid end portion passing through said outer tube wall and having a first end portion within said enclosure bearing elastically against said first tubular electrode to effect an electrical connection therewith and to permit removal of said first tubular electrode and replacement during repair of said laser discharge tube.

2. The laser discharge tube as claimed in claim 1, wherein said support means comprises a plurality of circumferentially spaced metal strip support elements bearing against said first tubular electrode at circumferentially spaced points and said support means further includes internal projections on said outer tube and bearing on said first tubular electrode at axially spaced positions with respect to said support elements and generally in line with said elements.

* * * * *